US011522630B1

(12) United States Patent
He

(10) Patent No.: US 11,522,630 B1
(45) Date of Patent: Dec. 6, 2022

(54) DISTRIBUTED ANTENNA SYSTEM AND COMMUNICATION SYSTEM

(71) Applicant: PROSE Technologies Co., Ltd., Jiangsu (CN)

(72) Inventor: Yaoguang He, Jiangsu (CN)

(73) Assignee: PROSE Technologies Co., Ltd., Suzhou (CN)

( * ) Notice: Subject to any disclaimer, the term of this patent is extended or adjusted under 35 U.S.C. 154(b) by 0 days.

(21) Appl. No.: 17/750,305

(22) Filed: May 21, 2022

(30) Foreign Application Priority Data

Dec. 6, 2021 (CN) .......................... 202111472040.2

(51) Int. Cl.
*H04B 10/2575* (2013.01)
*H04J 14/02* (2006.01)
*H04B 10/50* (2013.01)
*H01Q 15/00* (2006.01)

(52) U.S. Cl.
CPC ..... *H04J 14/0216* (2013.01); *H01Q 15/0033* (2013.01); *H04B 10/25759* (2013.01); *H04B 10/503* (2013.01); *H04B 10/506* (2013.01); *H04J 14/022* (2013.01); *H04B 10/2575* (2013.01); *H04B 10/25753* (2013.01)

(58) Field of Classification Search
None
See application file for complete search history.

(56) References Cited

U.S. PATENT DOCUMENTS

| 7,715,722 | B1 * | 5/2010 | Hoke | H04B 10/25758 |
| | | | | 455/39 |
| 8,694,034 | B2 * | 4/2014 | Notargiacomo | ............................ |
| | | | | H04B 10/25753 |
| | | | | 370/338 |
| 9,184,842 | B2 * | 11/2015 | Dahlfort | H04B 10/25759 |
| 9,306,669 | B2 * | 4/2016 | Ko | H04B 10/25754 |
| 9,374,187 | B2 * | 6/2016 | Kim | H04J 14/025 |
| 9,917,672 | B2 * | 3/2018 | Jensen | H04J 14/04 |
| 10,051,350 | B2 * | 8/2018 | Stapleton | H04B 10/25753 |
| 10,491,273 | B2 * | 11/2019 | Schmid | H04B 1/0096 |
| 10,735,095 | B1 * | 8/2020 | Kim | H04B 10/25752 |
| 11,316,589 | B2 * | 4/2022 | Park | H04B 10/506 |
| 11,356,190 | B2 * | 6/2022 | Hanson | H04L 7/0075 |
| 11,374,654 | B2 * | 6/2022 | Morton | H04B 10/25759 |

(Continued)

*Primary Examiner* — Jai M Lee
(74) *Attorney, Agent, or Firm* — King & Wood Mallesons

(57) ABSTRACT

A distributed antenna system comprises: one or more access units configured to receive multiple downlink radio frequency signal sets, and further configured to convert the multiple downlink radio frequency signal sets into multiple downlink optical signal sets; a first wavelength division multiplexing unit configured to multiplex the multiple downlink optical signal sets to generate a first wavelength division multiplexing optical signals; a first wavelength division demultiplexing unit configured to demultiplex the first wavelength division multiplexing optical signals to obtain the multiple downlink optical signal sets; a first optical fiber, coupled between the first wavelength division multiplexing unit and the first wavelength division demultiplexing unit, and configured to transmit the first wavelength division multiplexing optical signal; and multiple first remote units coupled to the first wavelength division multiplexing unit, and configured to convert the multiple downlink optical signal sets into the multiple downlink radio frequency signal sets for transmission.

20 Claims, 6 Drawing Sheets

(56) References Cited

U.S. PATENT DOCUMENTS

| | | | |
|---|---|---|---|
| 11,374,656 B2* | 6/2022 | Otsuki | H04B 10/501 |
| 2011/0135301 A1* | 6/2011 | Myslinski | H04B 10/572 |
| | | | 398/34 |
| 2011/0135308 A1* | 6/2011 | Tarlazzi | H04B 7/0413 |
| | | | 398/118 |
| 2012/0051739 A1* | 3/2012 | Stephens | H04B 10/0773 |
| | | | 398/25 |
| 2014/0169794 A1* | 6/2014 | Notargiacomo | ............ |
| | | | H04B 10/25758 |
| | | | 398/115 |
| 2022/0094459 A1* | 3/2022 | Haraguchi | H04B 10/506 |

* cited by examiner

DISTRIBUTED ANTENNA SYSTEM AND COMMUNICATION SYSTEM

FIELD

Embodiments of the present disclosure relate to the field of communications, and more specifically, to a distributed antenna system and a communication system.

BACKGROUND

A distributed antenna system receives downlink signals from a base station (Base Station, BS) to transmit to user equipment (User Equipment, UE), and receives uplink signals transmitted by the user equipment to transmit to the base station. In a traditional distributed antenna system, as shown in FIG. 1, multi-band access modules (121-1 and 121-2) in an access unit 120 receive multi-band downlink signals from multiple base stations (110-1 to 110-m) to which multiple operators belong. First optical modules (122-1 and 122-2) in the access unit 120 couple signals of different frequency bands and convert them into optical signals, and transmit the optical signals to the (high-power) remote units (130-1 to 130-n) via optical fibers.

In a remote unit (e.g., 130-1), the optical signals are restored to a multi-band radio frequency signals through second optical modules (131-1 and 131-2). The multi-band radio frequency signals are divided by power division modules (132-1, 132-2, 132-3 and 132-4) and then fed into the low-noise amplifier & power amplifier modules (133-1 to 133-k) of each frequency band to achieve power amplification and fed into antennas (140-1 and 140-2) coverage through combiners (134-1 to 134-2).

The uplink signals fed by the antennas (140-1 and 140-2) are coupled in power division modules (132-1 to 132-4) after low-noise amplification through low-noise amplifier & power amplifier modules (133-1 to 133-k). -4), and then enter the second optical modules (131-1 and 131-2) for photoelectric conversion into optical signals and then are transmitted to the access unit 120 through optical fibers. In the access unit 120, the optical signal is separated into signals of various frequency bands and then fed into the base stations of each operator (110-1 to 110-m) to complete processing of the uplink signals.

The traditional distributed antenna system uses an ordinary optical module, and optical wavelength drifts greatly with temperature and other changes. Generally, two wavelengths of 15XX nm and 13XX nm are selected in one optical fiber to transmit the uplink and the downlink signals respectively.

FIG. 2 is a schematic diagram of a first optical module 200 in an access unit according to the prior art. As shown in FIG. 2, the first optical module 200 in the access unit may at least include a laser 210, an optical power divider 220, multiple wavelength division multiplexers and demultiplexers 230-1 to 230-n, multiple optical transceiver ports 240-1 to 240-n, photodetectors 250-1 to 250-n, a combiner 260. The laser 210 is used to convert the received radio frequency signals into optical signals. The optical power divider 220 is used for dividing the optical signals into n channels correspondingly and sending them to the wavelength division multiplexers and demultiplexers 230-1 to 230-n for multiplexing and then outputting through the optical transceiver ports 240-1 to 240-n. The optical transceiver ports 240-1 to 240-n are also used for receiving optical signals, and the wavelength division multiplexers and demultiplexers 230-1 to 230-n demultiplex the optical signals and output them to the optical detectors 250-1 to 250-n. The optical detectors 250-1 to 250-n are used to realize photoelectric conversion, and output n radio frequency signals to the combiner 260 for combining and outputting.

FIG. 3 is a schematic diagram of a second optical module 300 in a remote unit according to the prior art. As shown in FIG. 3, the second optical module 300 in the remote unit may at least include an optical transceiver port 310, a wavelength division multiplexing demultiplexer 320, an optical detector 330 and a laser 340. The optical transceiver port 310 is used for receiving and transmitting optical signals. The wavelength division multiplexing demultiplexer 320 is configured to demultiplex the optical signals received by the optical transceiver port 310, and transmit the demultiplexed optical signal to the optical detector 330. The wavelength division multiplexing demultiplexer 320 is further configured to multiplex the optical signals received from the laser 340, and transmit the multiplexed optical signals via the optical transceiver port 310. The photodetector 330 is used for photoelectric conversion of the demultiplexed optical signal received from the wavelength division multiplexing demultiplexer 320 to generate radio frequency signals. The laser 340 is used to convert the received radio frequency signals into optical signals, and transmit the optical signal to the wavelength division multiplexing demultiplexer 320.

The number of optical fibers consumed by the above-mentioned conventional distributed antenna system for the case of multi-signal set transmission, for example, will increase with the increase of the number of signals, failing to meet the application requirements under the condition of limited optical fiber resources.

SUMMARY

A distributed antenna system and a communication system capable of reducing the number of optical fibers are provided.

In accordance with the first aspect of the present disclosure, there is provided a distributed antenna system. The distributed antenna system comprises: one or more access units configured to receive multiple downlink radio frequency signal sets from at least one base station, and the one or more access units are further configured to convert the multiple downlink radio frequency signal sets into multiple downlink optical signal sets; a first wavelength division multiplexing unit, coupled to the one or more access units, and configured to multiplex the multiple downlink optical signal sets to generate a first wavelength division multiplexing optical signals; a first wavelength division demultiplexing unit configured to demultiplex the first wavelength division multiplexing optical signals to obtain the multiple downlink optical signal sets; a first optical fiber, coupled between the first wavelength division multiplexing unit and the first wavelength division demultiplexing unit, and configured to transmit the first wavelength division multiplexing optical signal; and one or more first remote units coupled to the first wavelength division multiplexing unit, and configured to convert the multiple downlink optical signal sets into the multiple downlink radio frequency signal sets for transmission.

In some embodiments, the one or more first remote units are further configured to receive multiple first uplink radio frequency signal sets via one or more first antenna sets, and to convert the multiple first uplink radio frequency signal sets into multiple first uplink optical signal sets, and the distributed antenna system further comprising: a second wavelength division multiplexing unit coupled to the one or more first remote units and configured to multiplex the multiple first uplink optical signal sets to generate second wavelength division multiplexing optical signals; a second wavelength division demultiplexing unit configured to demultiplex the second wavelength division multiplexing optical signals to obtain the multiple first uplink optical signal sets; a second optical fiber, coupled between the second wavelength division multiplexing unit and the second wavelength division demultiplexing unit, configured to transmit the second wavelength division multiplexing optical signals; and the one or more access units coupled to the second wavelength division demultiplexing unit, and further configured to convert the multiple first uplink optical signal sets into the multiple first uplink radio frequency signal sets for transmission to the at least one base station.

In some embodiments, the distributed antenna system further comprises: an optical division unit coupled between the first wavelength division multiplexing unit and the first wavelength division demultiplexing unit, and configured to divide the first wavelength division multiplexing optical signals to obtain third wavelength division multiplexing optical signals; a third wavelength division demultiplexing unit coupled to the optical division unit and configured to demultiplex the third wavelength division multiplexing optical signals to obtain the multiple downlink optical signal sets; and one or more second remote units coupled to the third wavelength division demultiplexing unit and configured to convert the multiple downlink optical signal sets into the multiple downlink radio frequency signal sets for transmission.

In some embodiments, the one or more second remote units are further configured to receive multiple second uplink radio frequency signal sets via the one or more second antenna sets, and to convert the multiple second uplink radio frequency signal sets into multiple second uplink optical signal sets, and the distributed antenna system further comprising: a third wavelength division multiplexing unit coupled to the one or more second remote units and configured to multiplex the multiple second uplink optical signal sets to generate fourth wavelength division multiplexing optical signals; and an optical coupling unit coupled between the second wavelength division multiplexing unit and the second wavelength division demultiplexing unit and coupled with the third wavelength division multiplexing unit, and configured to couple the fourth wavelength division multiplexing optical signals with the second wavelength division multiplexing optical signals for transmission through the second optical fiber.

In some embodiments, the distributed antenna system further comprises: a first optical amplifying unit coupled between the first wavelength division multiplexing unit and the optical division unit, and configured to perform optical signal amplification on the first wavelength division multiplexing optical signals.

In some embodiments, the distributed antenna system further comprises: a second optical amplifying unit, coupled between the optical coupling unit and the second wavelength division demultiplexing unit, and configured to perform optical signal amplification on the second wavelength division multiplexing optical signals; a third optical amplifying unit, coupled between the optical division unit and the third wavelength division demultiplexing unit, and configured to perform optical signal amplification on the third wavelength division multiplexing optical signals; and a fourth optical amplifying unit, coupled between the third wavelength division multiplexing unit and the optical coupling unit, and configured to perform optical signal amplification on the fourth wavelength division multiplexing optical signals.

In some embodiments, each of the multiple access units is configured to receive a corresponding downlink radio frequency signal set from at least one base station, and the corresponding downlink radio frequency signal set includes multi-channel downlink radio frequency signals for multiple-input and multiple-output (MIMO) and each of the multiple access units in the access unit is further configured to convert multi-channel downlink radio frequency signals into a downlink optical signal set, and the downlink optical signal set includes multiple downlink optical signals, and the number of the multiple downlink optical signals is the same as the number of channel of the multi-channel downlink radio frequency signals; and each of the one or more first remote units is configured to convert multiple downlink optical signals in the corresponding downlink optical signal set into a downlink radio frequency signal set for transmission.

In some embodiments, each of the multiple downlink radio frequency signal sets includes one channel of downlink radio frequency signals for single-input and single-output (SISO).

In some embodiments, each of the multiple first remote units is configured to receive a corresponding first uplink radio frequency signal set via a first antenna set couple to the first remote unit, and the corresponding first uplink radio frequency signal set includes multi-channel uplink radio frequency signals for MIMO, and the each first remote unit is further configured to convert the multi-channel uplink radio frequency signals into the first uplink optical signal set, and the first uplink optical signal set includes multiple uplink optical signals, and the number of the multiple uplink optical signals is the same as that of channel of the multi-channel uplink radio frequency signals; and each of the one or more access units is configured to convert corresponding first uplink optical signal set into the first uplink radio frequency signal set for transmission to the at least one base station.

In some embodiments, each of the multiple first uplink radio frequency signal sets comprises one channel of uplink radio frequency signals for SISO.

In some embodiments, the distributed antenna system further comprises one or more first antenna sets coupled to the one or more first remote units and configured to transmit the multiple downlink radio frequency signal sets.

In some embodiments, the multiple downlink radio frequency signal sets are associated with one or more sectors.

In accordance with the second aspect of the present disclosure, there is provided a communication system. A communication system comprises one or more base stations; and the distributed antenna system of any of the first aspect is coupled to the one or more base stations.

Through the embodiments of the present disclosure, multiple downlink optical signal sets converted from multiple downlink radio frequency signal sets are performed with wavelength division multiplexing and transmitted through one optical fiber. The number of optical fibers does not increase with the number of signals, the number of access units, or the number of remote units, greatly reducing the number of optical fibers used in the distributed antenna system.

It should be understood that the content described in this section is not intended to identify key or critical features of embodiments of the present disclosure, nor is it intended to limit the scope of the present disclosure. Other features of the present disclosure will become readily understood from the following description.

BRIEF DESCRIPTION OF THE DRAWINGS

The above and other features, advantages and aspects of various embodiments of the present disclosure will become more apparent when taken in conjunction through with reference to the following detailed description. In the drawings, the same or similar reference signs refer to the same or similar elements.

DETAILED DESCRIPTION OF EMBODIMENTS

Exemplary embodiments of the present disclosure are described below with reference to the accompanying drawings, which include various details of the embodiments of the present disclosure to facilitate understanding and should be considered as exemplary only. Accordingly, those of ordinary skill in the art will recognize that various changes and modifications of the embodiments described herein can be made without departing from the scope and spirit of the present disclosure. Also, descriptions of well-known functions and constructions are omitted from the following description for clarity and conciseness.

As used herein, the term "includes" and its variants are to be read as open-ended terms that mean "includes, but is not limited to." The term "or" is to be read as "and/or". The term "based on" is to be read as "based at least in part on." The terms "one example embodiment" and "one embodiment" are to be read as "at least one example embodiment." The following text also can include other explicit and implicit definitions. The term "another embodiment" is to be read as "at least one additional embodiment." The terms "first", "second", etc. may refer to different or the same objects. The term "unit", "module" and "port" include circuit/circuits. The following text may include other explicit and implicit definitions.

Figure 1:
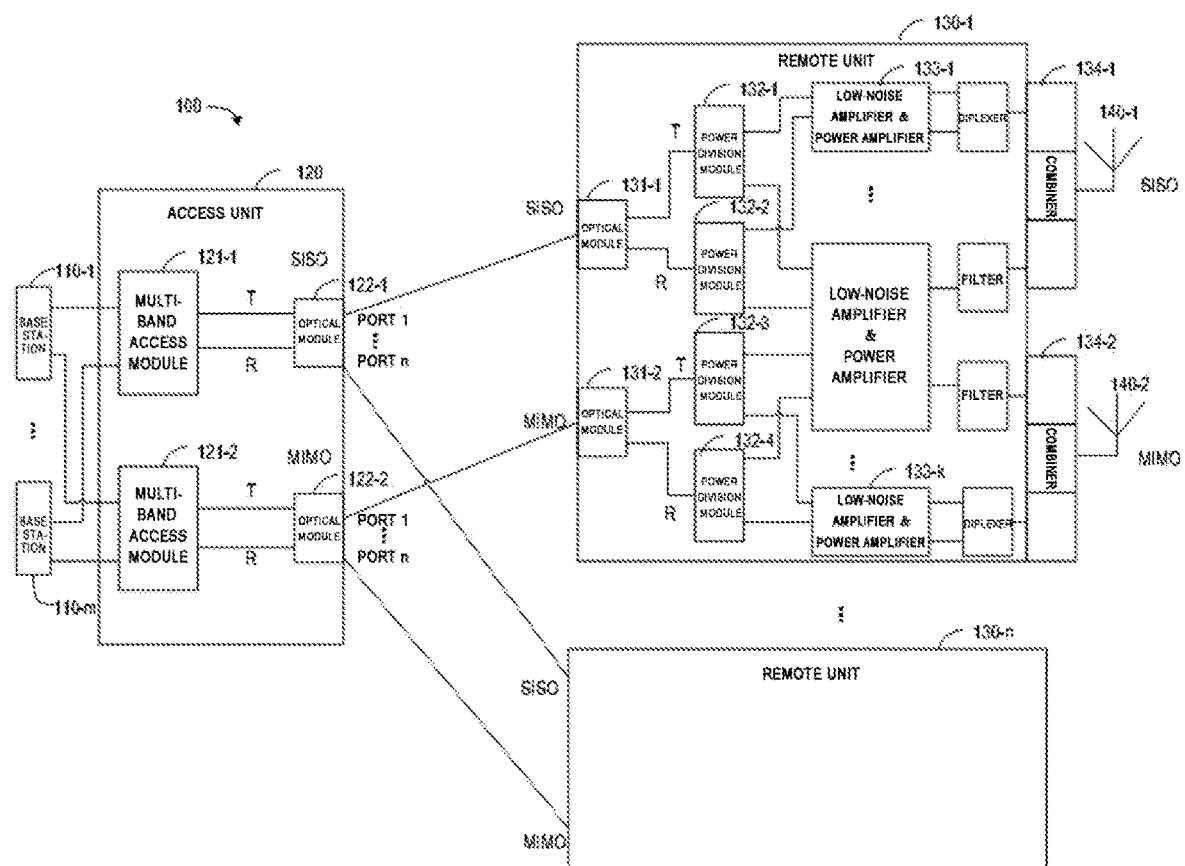
FIG. 1 illustrates a schematic diagram of a distributed antenna system 100 according to the prior art.
Figure 2:
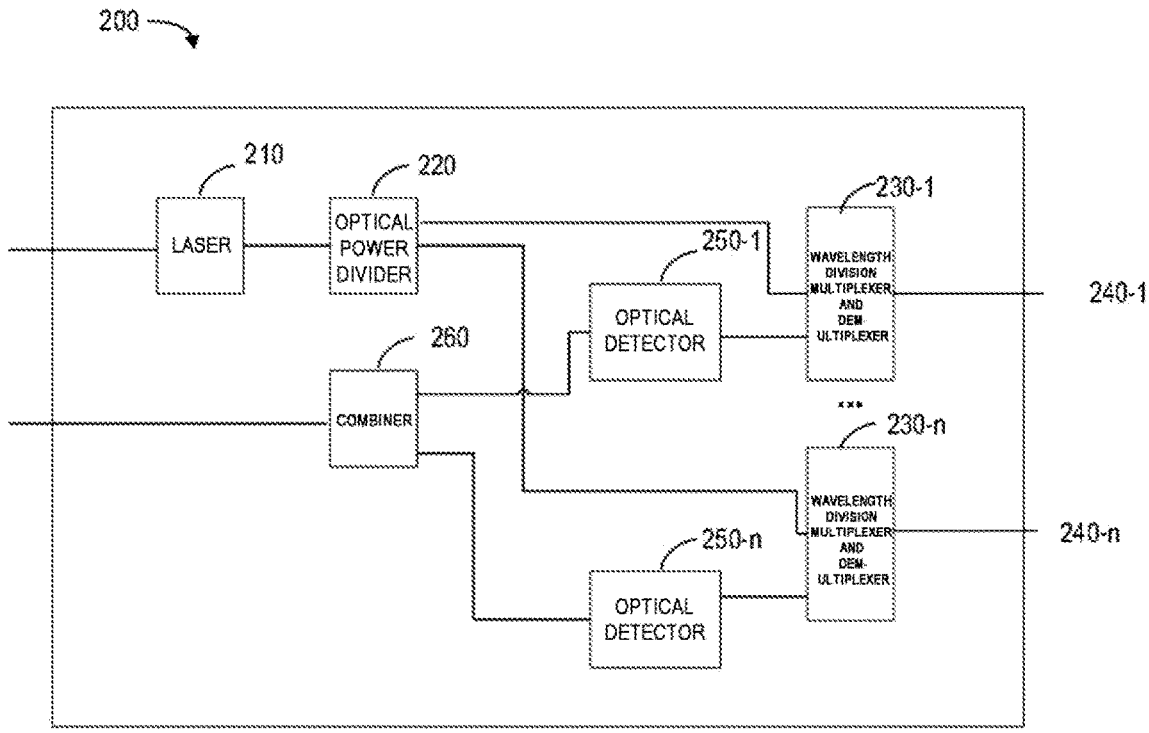
FIG. 2 illustrates a schematic diagram of a first optical module 200 in an access unit according to the prior art.
Figure 3:
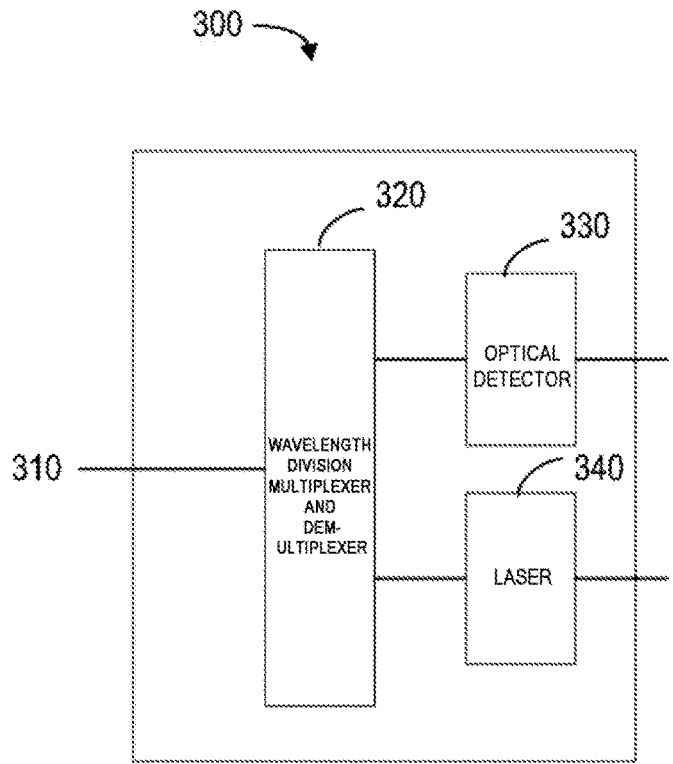
FIG. 3 illustrates a schematic diagram of a second optical module 300 in a remote unit according to the prior art.

As described above, the number of optical fibers consumed by the conventional distributed antenna system for the case of multi-signal set transmission, will increase with the increase of the number of signals. In addition, in the case of multiple remote units or multiple access units, the number of optical fibers will also increase with the increase of the number of remote units or access units, so it is not applicable to the situation where optical fiber resources are limited. Moreover, as shown in FIG. 1, the access unit 120 and the remote units (130-1 to 130-$n$) are in a star-type connection, and do not support a chain-type connection. Under the application condition of 2*2MIMO (Multi-Input Multi-Output, MIMO) as shown in FIG. 1, n remote units need 2n fibers. For subway tunnels and other chain coverage and severely limited optical fiber resources, the conventional distributed antenna system will not meet the application requirements.

To at least partially address one or more of the above-mentioned problems and other potential problems, example embodiments of the present disclosure propose a distributed antenna system. The distributed antenna system comprises: one or more access units configured to receive multiple downlink radio frequency signal sets from at least one base station, and the one or more access units are further configured to convert the multiple downlink radio frequency signal sets into multiple downlink optical signal sets; a first wavelength division multiplexing unit, coupled to the one or more access units, and configured to multiplex the multiple downlink optical signal sets to generate a first wavelength division multiplexing optical signals; a first wavelength division demultiplexing unit configured to demultiplex the first wavelength division multiplexing optical signals to obtain the multiple downlink optical signal sets; a first optical fiber, coupled between the first wavelength division multiplexing unit and the first wavelength division demultiplexing unit, and configured to transmit the first wavelength division multiplexing optical signal; and one or more first remote units coupled to the first wavelength division demultiplexing unit, and configured to convert the multiple downlink optical signal sets into the multiple downlink radio frequency signal sets for transmission. By this way, after one or more access units convert the multiple downlink radio frequency signal sets into multiple downlink optical signal sets, the first wavelength division multiplexing unit performs wavelength division multiplexing to the multiple downlink optical signal sets and transmits through an optical fiber, and then the first wavelength division demultiplexing unit performs division demultiplexing to the multiple downlink optical signal sets so as to restore into multiple downlink optical signal sets, and then one or more first remote units convert multiple downlink optical signal sets to multiple downlink radio frequency signal sets for multiple sectors for transmission. The transmission of multiple downlink signal sets is realized with only one optical fiber, and the number of optical fibers does not increase with the number of signals, the number of access units, or the number of remote units, greatly reducing the number of optical fibers used in the distributed antenna system.

Hereinafter, specific examples of the present solution will be described in more detail with reference to the accompanying drawings.

Figure 4:
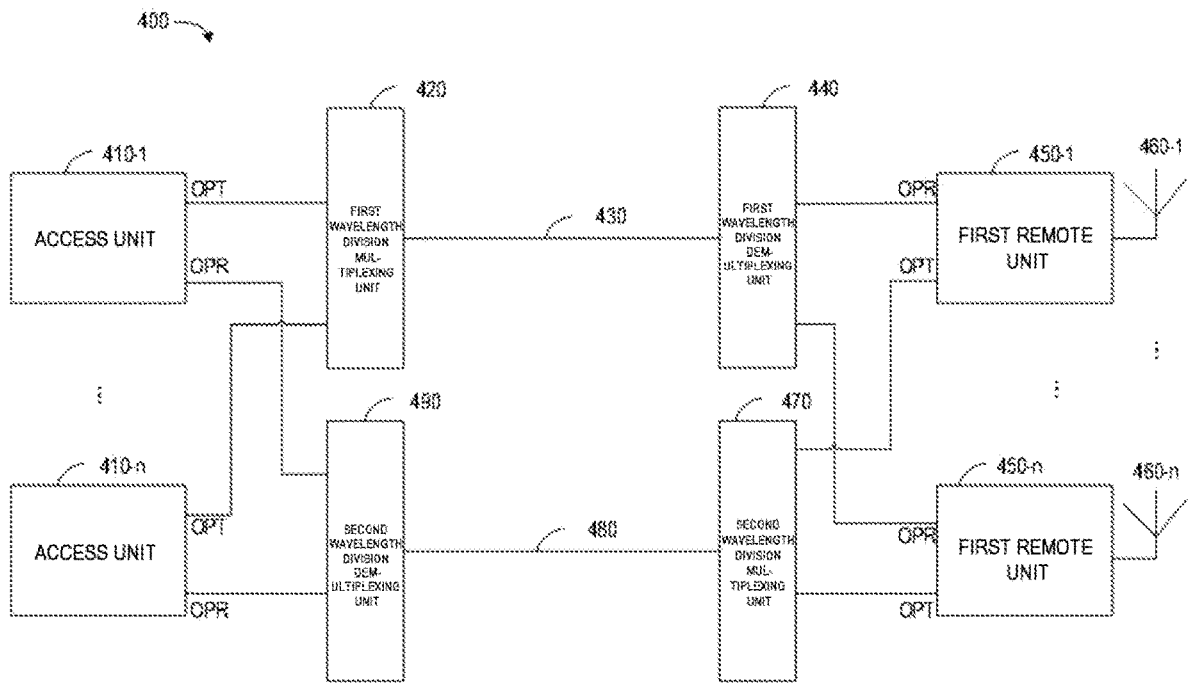
FIG. 4 illustrates a schematic diagram of a distributed antenna system 400 according to a first embodiment of the present disclosure.

FIG. 4 illustrates a schematic diagram of a distributed antenna system 400 according to a first embodiment of the present disclosure. As shown in FIG. 4, the distributed antenna system 400 includes one or more access units/ circuits 410-1 to 410-$n$ (n is greater than or equal to 1), a first wavelength division multiplexing unit/circuit 420, a first optical fiber 430, a first wavelength division demultiplexing unit/circuit 440, one or more first remote units/circuits 450-1 to 450-$n$, and one or more first antenna sets 460-1 to 460-$n$. It should be understood that although FIG. 4 shows that the number of the access units and that of the first remote units are the same, this is only an example, and the number of the access units and that of the first remote units may be different, for example, one access unit, more first remote units, or more access units, one first remote unit.

One or more access units 410-1 to 410-$n$, are configured to receive multiple downlink radio frequency signal sets from at least one base station (not shown), and to convert the multiple downlink radio frequency signal sets into multiple downlink optical signal sets. Different downlink optical signals in the multiple downlink optical signal set have different optical wavelengths. In some embodiments, multiple downlink radio frequency signal sets are associated with multiple sectors, for example, one sector may correspond to one downlink radio frequency signal set. In other embodiments, multiple downlink radio frequency signal sets are associated with a sector. Each of the access units 410-1 to 410-$n$ may include at least one optical transmission port OPT and at least one optical reception port OPR. For example, when one access unit receives multiple downlink radio frequency signal sets, the access unit may include multiple optical transmission ports OPT and multiple optical reception ports OPR. In the case where multiple access units receive multiple downlink radio frequency signal sets, the access unit may include one or more optical transmission ports OPT and one or more optical reception ports OPR. Specifically, the access units 410-1 to 410-$n$ may include one or more access modules and one or more optical modules. For example, when one access unit receives multiple downlink radio frequency signal sets, the access unit may include multiple access modules and multiple optical modules. Accordingly, the access unit may include multiple optical transmission ports OPT. When multiple access units receive multiple downlink radio frequency signal sets, each access unit may include one or more access modules and one or more optical modules. Accordingly, each access unit may include one or more optical transmission ports OPT. In the case where the access units 410-1 to 410-$n$ are connected to one base station, the access module may be a single-band access module. In the case where the access units 410-1 to 410-$n$ are connected with multiple base stations, the access module may be a multi-band access module. Single-band access modules and multi-band access modules may be implemented using any suitable technology.

The first wavelength division multiplexing unit 420 is coupled to one or more access units 410-1 to 410-$n$, for example, coupled with multiple optical transmission ports OPT of the one or more access units 410-1 to 410-$n$. The first wavelength division multiplexing unit 420 is configured to multiplex multiple downlink optical signal sets to generate a first wavelength division multiplexing optical signals.

The first optical fiber 430 is coupled between the first wavelength division multiplexing unit 420 and the first wavelength division demultiplexing unit 440. The first optical fiber 430 is configured to transmit the first wavelength division multiplexing optical signals.

The first wavelength division demultiplexing unit 440 is configured to demultiplex the first wavelength division multiplexing optical signals to obtain multiple downlink optical signal sets.

One or more the first remote units 450-1 to 450-$n$ may be coupled with the first wavelength division demultiplexing unit 440 via multiple optical reception ports OPR. One or more the first remote units 450-1 to 450-$n$ may be configured to convert the multiple downlink optical signal sets to the multiple downlink radio frequency signal sets for transmission.

One or more first remote units 450-1 through 450-$n$ may be coupled with one or more first antenna sets 460-1 through 460-$n$. One or more the first antenna sets 460-1 to 460-$n$ may be configured to transmit multiple downlink radio frequency signal sets. In some embodiments, the multiple first antenna sets 460-1 through 460-$n$ may be configured to transmit multiple downlink radio frequency signal sets to multiple sectors. In other embodiments, the multiple first antenna sets 460-1 through 460-$n$ may be configured to transmit multiple downlink radio frequency signal sets to a sector.

Each of the first remote units 450-1 to 450-$n$ may include at least one optical transmission port OPT and at least one optical reception port OPR. For example, in the case where one first remote unit receives multiple downlink optical signal sets, the first remote unit may include multiple optical reception ports OPR. In the case where multiple first remote units receive multiple downlink optical signal sets, the first remote units may include one or more optical reception ports OPR. The second optical modules/circuits included in the first remote units 450-1 to 450-$n$ will be described in detail with reference to FIG. 9, and other modules in the first remote unit can be implemented by any suitable solution, such as power division modules, power amplifiers low noise amplifier module, etc.

Thus, for the situation of multiple downlink radio frequency signal sets, after one or more access units convert the multiple downlink radio frequency signal sets into multiple downlink optical signal sets, the first wavelength division multiplexing unit performs wavelength division multiplexing to the multiple downlink optical signal sets and transmits through an optical fiber, and then the first wavelength division demultiplexing unit performs division demultiplexing to the multiple downlink optical signal sets so as to restore into multiple downlink optical signal sets, and then one or more first remote units convert multiple downlink optical signal sets to multiple downlink radio frequency signal sets for transmission. The solution of the present disclosure realizes the transmission of multiple downlink signal sets with only one optical fiber and the number of optical fibers does not increase with the increase of the number of signals, the number of access units or the number of remote units, greatly reducing the number of fibers compared with the conventional solution wherein multiple optical fibers are required.

In addition, the distributed antenna system 400 may further include a second wavelength division multiplexing unit/circuit 470, a second optical fiber 480, and a second wavelength division demultiplexing unit/circuit 490.

The one or more first remote units 450-1 through 450-$n$ may also be configured to receive multiple first uplink radio frequency signal sets via the one or more first antenna sets 460-1 through 460-$n$, and to convert the multiple first uplink radio frequency signal sets into multiple first uplink optical signal sets. Different uplink optical signals in the multiple uplink optical signal sets have different optical wavelengths. In some embodiments, multiple first uplink radio frequency signal sets are associated with multiple sectors, for example, one sector may correspond to one first uplink radio frequency signal set. In other embodiments, multiple first uplink radio frequency signal sets are associated with a sector.

The second wavelength division multiplexing unit 470 is coupled with one or more first remote units 450-1 to 450-$n$, for example, coupled to multiple optical transmission ports of one or more first remote units 450-1 to 450-$n$. For example, in the case where one first remote unit receives multiple first uplink radio frequency signal sets, the first remote unit may include multiple optical transmission ports OPT. In the case where multiple first remote units receive multiple first uplink radio frequency signal sets, each first remote unit may include one or more optical transmission ports OPT. The second wavelength division multiplexing unit 470 is configured to multiplex the multiple first uplink optical signal sets to generate second wavelength division multiplexing optical signals.

The second optical fiber 480 is coupled between the second wavelength division multiplexing unit 470 and the second wavelength division demultiplexing unit 490. The second optical fiber 480 is configured to transmit the second wavelength division multiplexing optical signals.

The second wavelength division demultiplexing unit 490 is configured to demultiplex the second wavelength division multiplexed optical signal to obtain multiple first uplink optical signal sets.

One or more access units 410-1 to 410-n are also coupled to the second wavelength division demultiplexing unit 490, for example, one or more access units 410-1 to 410-n may couple to the second wavelength division demultiplexing unit 490 via multiple optical reception ports OPR. For example, in the case that one access unit receives multiple uplink optical signal sets, the access unit may include multiple optical reception ports OPR. In the case where multiple access units receive multiple uplink optical signal sets, each access unit may include one or more optical reception ports OPR. One or more the access units 410-1 to 410-n may also be configured to convert the multiple first uplink optical signal sets into the multiple first uplink radio frequency signal sets for transmission to at least one base station.

Thus, for the situation of multiple uplink radio frequency signal sets, after one or more remote units convert the multiple uplink radio frequency signal sets into multiple uplink optical signal sets, the second wavelength division multiplexing unit performs wavelength division multiplexing to the multiple uplink optical signal sets and transmits through an optical fiber, and then the second wavelength division demultiplexing unit performs division demultiplexing to the multiple uplink optical signal sets so as to restore into multiple uplink optical signal sets, and then one or more first access units convert multiple uplink optical signal sets to multiple uplink radio frequency signal sets for transmission to base station. The solution of the present disclosure realizes the transmission of multiple uplink signal sets with only one optical fiber and the number of optical fibers does not increase with the increase of the number of signals, the number of access units or the number of remote units, greatly reducing the number of fibers compared with the conventional solution wherein multiple optical fibers are required.

In some embodiments, the downlink radio frequency signal set may include one channel of downlink radio frequency signals for SISO.

In other embodiments, the downlink radio frequency signal set may include multi-channel of downlink radio frequency signals for MIMO. In this case, each of the multiple access units may be configured to receive a corresponding downlink radio frequency signal set from at least one base station. The corresponding downlink radio frequency signal set includes multi-channel of downlink radio frequency signals for MIMO.

Each access unit may also be configured to convert the downlink radio frequency signal set including multiple downlink radio frequency signals used for MIMO into a downlink optical signal set, where the downlink optical signal set includes multiple downlink optical signals. The number of multiple downlink optical signals is the same as the number of multi-channel downlink radio frequency signals. In addition, different downlink optical signals among the multiple downlink optical signals have different optical wavelengths.

Each first remote unit in the multiple first remote units can be configured to convert multiple downlink optical signals in the corresponding downlink optical signal set into the downlink radio frequency signal set including a multi-channel downlink radio frequency signals used for MIMO for transmission. The first antenna set coupled to the first remote unit may be configured to transmit a downlink radio frequency signal set, e.g., to a corresponding sector.

In still other embodiments, when one access unit receives multiple downlink radio frequency signal sets, the multiple downlink radio frequency signal sets may include multi-channel downlink radio frequency signals for MIMO, wherein each downlink radio frequency signal set includes one channel of downlink radio frequency signal among the multi-channel downlink radio frequency signals.

Figure 5:
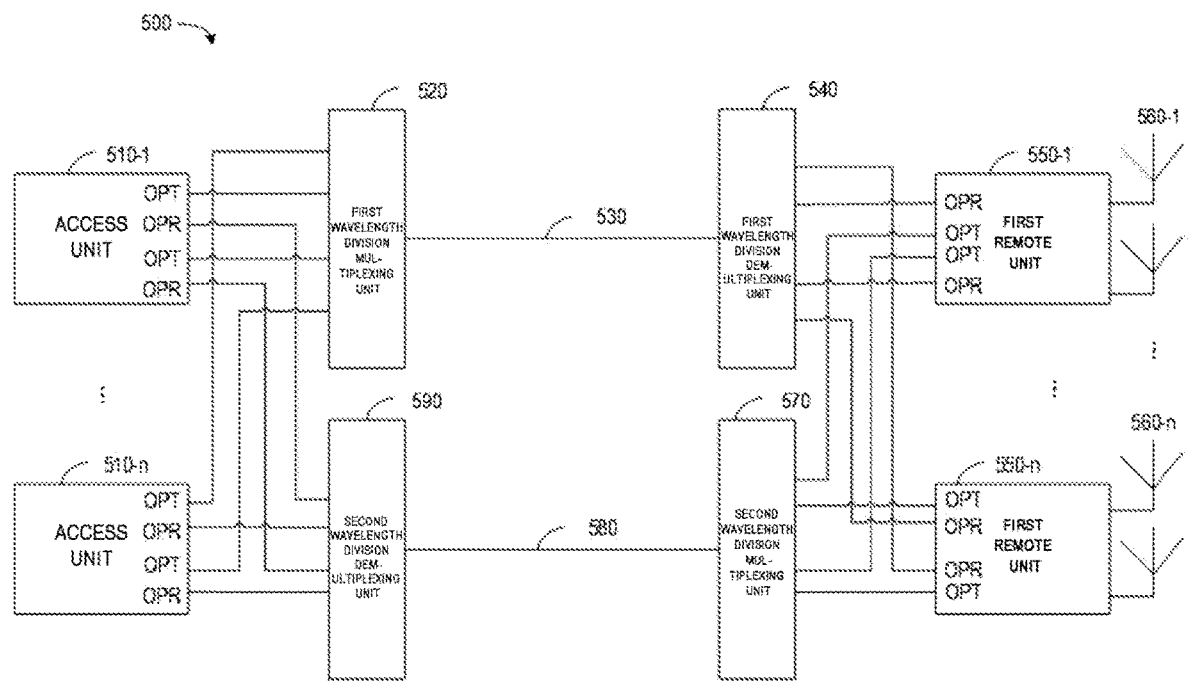
FIG. 5 illustrates a schematic diagram of a distributed antenna system 500 according to a second embodiment of the present disclosure.

FIG. 5 illustrates a schematic diagram of a distributed antenna system 500 according to a second embodiment of the present disclosure. As shown in FIG. 5, the access unit 510-1 includes two optical transmission ports OPT, for example, in the case of 2*2 MIMO. The downlink radio frequency signal set includes two channels of downlink radio frequency signals, and the access unit 510-1 can convert the two channels of downlink radio frequency signals into two downlink optical signals via two optical modules (not shown), which are respectively transmitted through two optical transmission ports OPT to the first wavelength division multiplexing unit 520. The rest of the access units (e.g., 510-n) are also similar and will not be described again. It should be understood that although FIG. 5 shows that the number of the access unit and that of the first remote unit are the same, this is only an example, and the number of the access unit and that of the first remote unit may be different, for example, one access unit, more first remote units, or more access units, one first remote unit, and so on.

The first wavelength division multiplexing unit 520 multiplexes these 2 downlink optical signals and the downlink optical signals received from other access units (a total of 2n downlink optical signals) and transmits them to first wavelength division demultiplexing unit 540 via the first optical fiber 530. It should be understood that there are no other access units if n equals to 1, The first wavelength division demultiplexing unit 540 demultiplexes the wavelength division multiplexed signal in the first optical fiber 530 to obtain these 2 downlink optical signals and the downlink optical signals received from other access units, a total of 2n downlink optical signals.

The first remote unit 550-1 includes two optical reception ports OPR. The first remote unit 550-1 can respectively receive the corresponding two downlink optical signals from the first wavelength division demultiplexing unit 540 through the two optical reception ports OPR, and convert the two downlink optical signals through two optical modules (not shown) into two channels of downlink radio frequency signals. The other first remote units (for example, 550-n) are also similar and will not be described again.

The first antenna set 560-1 may include two antennas for transmitting two channels of downlink radio frequency signals from the first remote unit 550-1, for example, to a corresponding sector. The rest of the first antenna set (for example, 560-*n*) are also similar and will not be described again.

Thus, for the MIMO situation, after the access unit converts the multi-channel downlink radio frequency signals used for MIMO into multiple downlink optical signals, the first wavelength division multiplexing unit performs wavelength division multiplexing to the multiple downlink optical signals and transmits through an optical fiber, and then the first wavelength division demultiplexing unit performs division demultiplexing to the multiple downlink optical signals so as to restore into multiple downlink optical signals, and then the first remote unit converts multiple downlink optical signals to multi-channel downlink radio frequency signals for MIMO for transmission. The solution of the present disclosure realizes the transmission of uplink signals for MIMO with only one optical fiber and the number of optical fibers does not increase with the increase of the number of signals, greatly reducing the number of fibers compared with the conventional solution wherein multiple fibers for MIMO are required.

In some embodiments, each of the multiple first uplink radio frequency signal sets includes multi-channel uplink radio frequency signals for MIMO. Each of the multiple first remote units may be configured to receive a corresponding first uplink radio frequency signal set via a first antenna set coupled to the first remote unit. Each of the multiple first remote units may also be configured to convert the multi-channel uplink radio frequency signals for MIMO included in the corresponding first uplink radio frequency signal set into the first uplink optical signal sets including multiple uplink optical signals. The number of multiple uplink optical signals is the same as that of channels of the multi-channel uplink radio frequency signals. Different uplink optical signals among the multiple uplink optical signals have different optical wavelengths.

Each of the one or more access units may also be configured to convert the corresponding first uplink optical signal set into a first uplink radio frequency signal set for transmission to at least one base station.

As also shown in FIG. 5, the first remote unit 550-1 includes two optical transmission ports OPT. The first remote unit 550-1 may receive a first uplink radio frequency signal set via the first antenna set 560-1, and the first uplink radio frequency signal set includes two uplink radio frequency signals. The first remote unit 550-1 converts the two uplink radio frequency signals into two uplink optical signals via two optical modules (not shown), and transmits them to the second wavelength division multiplexing unit 570 via two optical transmission ports OPT. The other first remote units (for example, 550-*n*) are also similar and will not be described again. It should be understood that there are no other first remote units when n equals to 1.

The second wavelength division multiplexing unit 570 multiplexes these 2 uplink optical signals and the uplink optical signals received from other first remote units (a total of 2n optical signals) together and transmits to the second wavelength division demultiplexing unit 590 via the second optical fiber 580.

The second wavelength division demultiplexing unit 590 demultiplexes the wavelength division multiplexed signal in the second optical fiber 580 to obtain the two uplink optical signals and the uplink optical signals received from other first remote units, a total of 2n uplink optical signals.

The access unit 510-1 includes two optical reception ports OPR. The access unit 510-1 receives the corresponding two uplink optical signals from the second wavelength division demultiplexing unit 590 via the two optical reception ports OPR respectively, and converts the two uplink optical signals via two optical modules (not shown) into two uplink radio frequency signals for transmission to at least one base station. The rest of the access units (e.g., 510-*n*) are also similar and will not be described again.

Thus, for the situation of MIMO, after the first remote unit converts the multi-channel uplink radio frequency signals for MIMO into multiple uplink optical signals, the second wavelength division multiplexing unit performs wavelength division multiplexing to the multiple uplink optical signal and transmits through an optical fiber, and then the second wavelength division demultiplexing unit performs division demultiplexing to the multiple uplink optical signal so as to restore into multiple uplink optical signal, and then access units convert multiple uplink optical signal to multiple uplink radio frequency signals for MIMO for transmission to base station. The solution of the present disclosure realizes multi-input and multi-output uplink signal transmission with only one optical fiber, and the number of optical fibers does not increase with the increase of the number of signals, the number of access units or the number of remote units, greatly reducing the number of fibers compared with the conventional solution wherein multiple optical fibers are required.

It should be understood that although FIG. 5 shows a situation of 2*2 MIMO, this is only an example, and other situations of MIMO, such as 4*4 MIMO, may also be used. For different MIMO scenarios, the access unit and the first remote unit may have a corresponding number of optical transmission ports and optical reception ports, and the first antenna set may have a corresponding number of antennas, and the scope of the present disclosure is not limited herein.

In other embodiments, each of the multiple first uplink radio frequency signal sets includes one channel of uplink radio frequency signal for SISO.

In still some embodiments, under the situation that a first remote unit receives multiple uplink radio frequency signal sets, the multiple uplink radio frequency signal sets can comprise the multi-channel uplink radio frequency signals for MIMO, wherein each uplink radio frequency signal set includes one channel of uplink radio frequency signals in the multi-channel uplink radio frequency signals.

Figure 6:
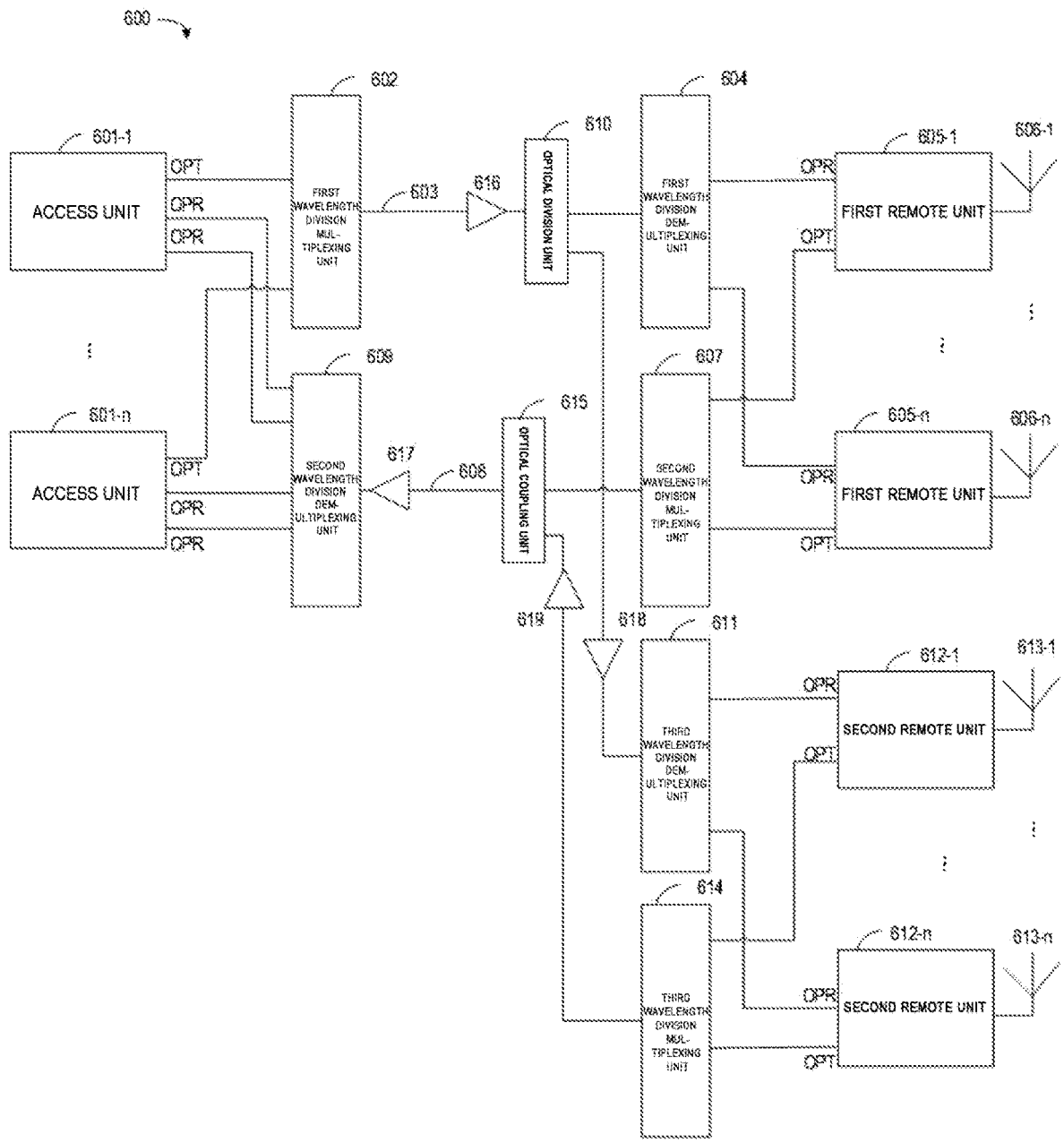
FIG. 6 illustrates a schematic diagram of a distributed antenna system 600 according to a third embodiment of the present disclosure.

FIG. 6 illustrates a schematic diagram of a distributed antenna system 600 according to a third embodiment of the present disclosure. The distributed antenna system 600 in FIG. 6 comprises an optical division unit/circuit 610, a third wavelength division demultiplexing unit/circuit 611, one or more second remote units/circuits 612-1 to 612-*n*, and one or more second antenna sets 613-1 to 613-*n* in addition to one or more access units 601-1 to 601-*n*, a first wavelength division multiplexing unit 602, a first optical fiber 603, a first wavelength division demultiplexing unit 604, one or multiple first remote units 605-1 to 605-*n* and one or more first antenna sets 606-1 to 606-*n*, a second wavelength division multiplexing unit 607, a second optical fiber 608, and a second wavelength division demultiplexing unit 609. One or more access units 601-1 to 601-*n*, a first wavelength division multiplexing unit 602, a first optical fiber 603, a first wavelength division demultiplexing unit 604, and one or more first remote units 605-1 to 605-*n* and one or more the first antenna sets 606-1 to 606-*n*, the second wavelength division multiplexing unit 607, the second optical fiber 608 and the second wavelength division demultiplexing unit 609 are described above and are not repeated herein. It should be understood that although FIG. 6 shows that the number of access units, the first remote unit and the second remote unit are the same, this is for illustration only, and the number of access units, the first remote unit and the second remote unit can be partially different or completely different.

The optical division unit 610 is coupled between the first wavelength division multiplexing unit 602 and the first wavelength division demultiplexing unit 604. The optical division unit 610 is configured to perform division to the first wavelength division multiplexing optical signals to obtain third wavelength division multiplexing optical signals.

The third wavelength division demultiplexing unit 611 is coupled to the optical division unit 610. The third wavelength division demultiplexing unit 611 is configured to perform wavelength division demultiplexing to the third wavelength division multiplexing optical signals to obtain multiple downlink optical signal sets.

One or more second remote units 612-1 to 612-n are coupled to the third wavelength division demultiplexing unit 611, e.g., via multiple optical reception ports OPR. For example, in the case where one second remote unit receives multiple downlink optical signal sets, the second remote unit may include multiple optical reception ports OPR. In the case where multiple second remote units receive multiple downlink optical signal sets, each second remote unit may include one or more optical reception ports OPR. One or more second remote units 612-1 to 612-n may be coupled with one or more second antenna sets 613-1 through 613-n. One or more the second remote units 612-1 through 612-n may be configured to convert multiple downlink optical signal sets to multiple downlink radio frequency signal sets for transmission. One or more the second antenna sets 613-1 to 613-n may be configured to transmit multiple downlink radio frequency signal sets. In some embodiments, multiple second antenna sets 613-1 to 613-n may be configured to transmit multiple downlink radio frequency signal sets to multiple sectors. In other embodiments, multiple second antenna sets 613-1 to 613-n may be configured to transmit multiple downlink radio frequency signal sets to a sector.

Thus, the chain-type connection of the downlink between the access unit and the remote unit can be realized, and for the situation of the multi-stage chain-type connection, only 2 optical fibers can be realized, and the number of optical fibers does not vary with the chain connection. The increase in the number of series of type connections greatly reduces the number of fibers. It is especially suitable for scenarios with chain coverage such as subway tunnels and severely limited optical fiber resources.

In addition, the distributed antenna system 600 may further include a third wavelength division multiplexing unit/circuit 614 and an optical coupling unit/circuit 615.

One or more second remote units 612-1 to 612-n may also be configured to receive multiple second uplink radio frequency signal sets via one or more second antenna sets 613-1 to 613-n, and to convert multiple second uplink radio frequency signal sets into multiple second uplink optical signal sets. In some embodiments, multiple second uplink radio frequency signal sets are associated with multiple sectors, for example, one sector may correspond to one second uplink radio frequency signal set. In other embodiments, multiple second uplink radio frequency signal sets are associated with a sector.

The third wavelength division multiplexing unit 614 is coupled with one or more second remote units 612-1 to 612-n, for example, coupled with multiple optical transmission ports OPT of one or more second remote units 612-1 to 612-n. For example, in the case where one second remote unit receives multiple second uplink radio frequency signal sets, the second remote unit may include multiple optical transmission ports OPT. In the case where multiple second remote units receive multiple second uplink radio frequency signal sets, each second remote unit may include one or more optical transmission ports OPT. The third wavelength division multiplexing unit 614 is configured to multiplex the multiple second uplink optical signal sets to generate fourth wavelength division multiplexing optical signals.

The optical coupling unit 615 is coupled between the second wavelength division multiplexing unit 607 and the second wavelength division demultiplexing unit 609 and is coupled with the third wavelength division multiplexing unit 614. The optical coupling unit 615 is configured to couple the fourth wavelength division multiplexed optical signal with the second wavelength division multiplexed optical signal for transmission via the second optical fiber 608.

The second wavelength division demultiplexing unit 609 may also be configured to demultiplex the fourth wavelength division multiplexing optical signals to obtain multiple second uplink optical signal sets.

One or more the access units 601-1 to 601-n may also be configured to convert multiple second uplink optical signal sets into multiple second uplink radio frequency signal sets for transmission to at least one base station.

Thus, the chain-type connection of uplink chain between access unit and remote unit can be realized, and one or more first remote units are located at the first level of chain-type, and one or more second remote units are located at the second level of the chain-type. For the case of multi-level chain connection, only 2 fibers can be implemented, which greatly reduces the number of fibers. This is especially suitable for scenarios with chain coverage such as subway tunnels and severely limited optical fiber resources.

In addition, the distributed antenna system 600 may further include a first optical amplifying unit/circuit 616, a second optical amplifying unit/circuit 617, a third optical amplifying unit/circuit 618, and a fourth optical amplifying unit/circuit 619.

The first optical amplifying unit 616 is coupled between the first wavelength division multiplexing unit 602 and the optical path dividing unit 610. The first optical amplifying unit 616 is configured to perform optical signal amplification on the first wavelength division multiplexing optical signals.

The second optical amplifying unit 617 is coupled between the optical coupling unit 615 and the second wavelength division demultiplexing unit 609. The second optical amplifying unit 617 is configured to perform optical signal amplification on the second wavelength division multiplexing optical signals.

The third optical amplifying unit 618 is coupled between the optical path dividing unit 610 and the third wavelength division demultiplexing unit 611. The third optical amplifying unit 618 is configured to perform optical signal amplification on the third wavelength division multiplexing optical signals.

The fourth optical amplifying unit 619 is coupled between the third wavelength division multiplexing unit 614 and the optical coupling unit 615. The fourth optical amplifying unit 619 is configured to perform optical signal amplification on the fourth wavelength division multiplexing optical signals.

Thereby, the power of the optical signal in each optical path can be increased, and the power attenuation in the optical path can be compensated.

Figure 7:
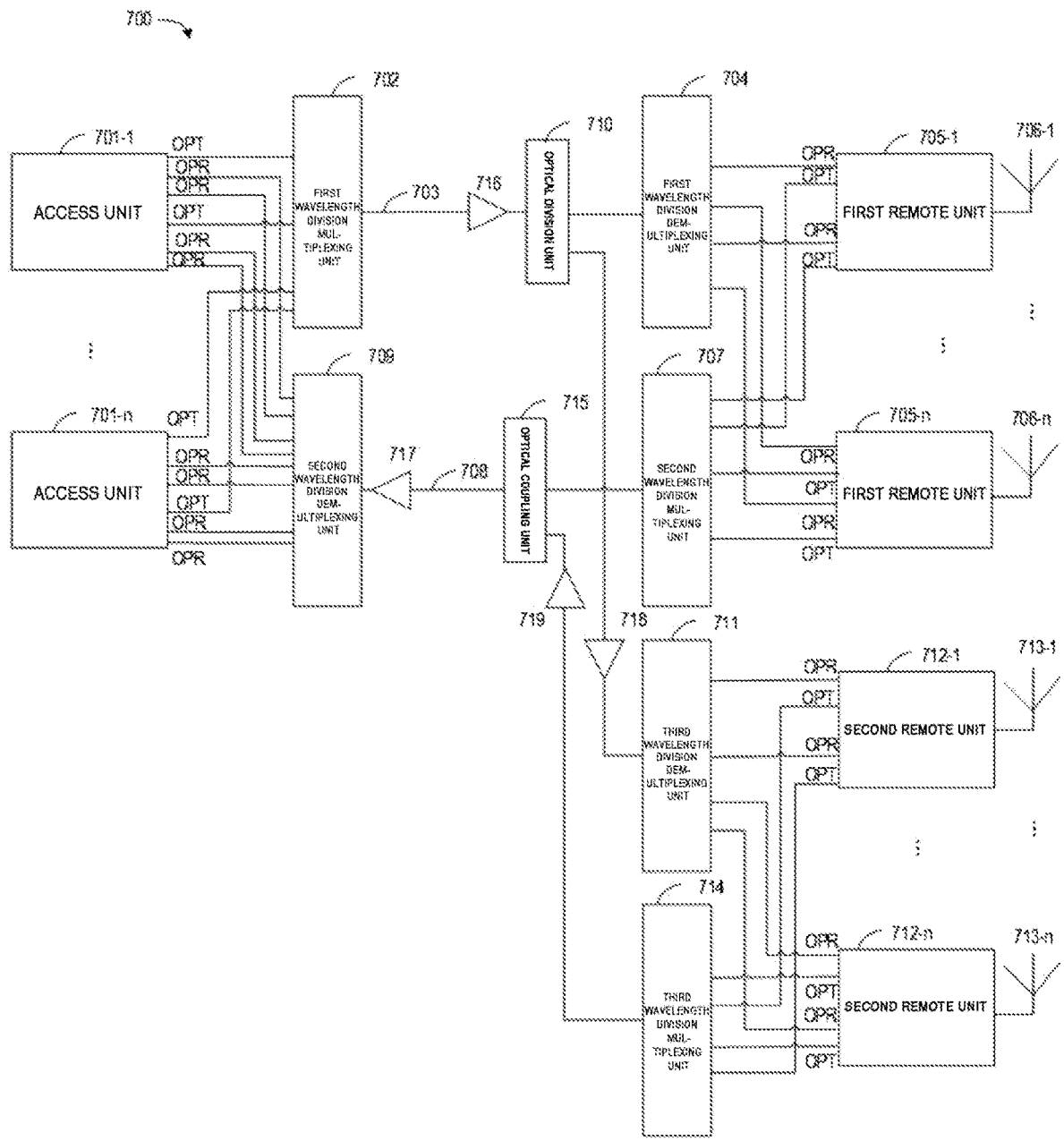
FIG. 7 illustrates a schematic diagram of a distributed antenna system 700 according to a fourth embodiment of the present disclosure.

FIG. 7 illustrates a schematic diagram of a distributed antenna system 700 according to a fourth embodiment of the present disclosure. The distributed antenna system 700 in FIG. 7 includes one or more access units 701-1 to 701-n, a first wavelength division multiplexing unit 702, a first optical fiber 703, a first wavelength division demultiplexing unit 704, one or more first remote units 705-1 to 705-n and one or more first antenna sets 706-1 to 706-n, a second wavelength division multiplexing unit 707, a second optical fiber 708, a second wavelength division demultiplexing unit 709, an optical path dividing unit 710, a third wavelength division demultiplexing unit 711, one or more second remote units 712-1 to 712-n, and one or more second antenna sets 713-1 to 713-n. The descriptions of the above-mentioned units can refer to the above, and will not be repeated here. It should be understood that although FIG. 7 shows that the number of access units is the same as that of first remote units and that of the second remote units, this is only an example, and the number of access units, first remote units and second remote units can be partially different or completely different.

As shown in FIG. 7, the access unit 701-1 includes two optical transmission ports OPT, for example, in the case of 2*2 MIMO. The downlink radio frequency signal set includes two downlink radio frequency signals, and the access unit 701-1 can convert the two downlink radio frequency signals into two downlink optical signals via two optical modules (not shown), and the access unit 701-1 can transmit two downlink optical signals to the first wavelength division multiplexing unit 702 respectively via the two optical transmission ports OPT. The rest of the access units (for example, 701-n) are also similar and will not be described again.

The first wavelength division multiplexing unit 702 multiplexes these 2 downlink optical signals and the downlink optical signals received from other access units (a total of 2n downlink optical signals) and transmits them to the first wavelength division demultiplexing unit 704 via the first optical fiber 703.

The optical division unit 710 divides the wavelength division multiplexed signals in the first optical fiber 703. One channel of the wavelength division multiplexed signals is transmitted to the first wavelength division demultiplexing unit 704, and the other channel of wavelength division multiplexed signals are sent to the third wavelength division demultiplexing unit 711.

The first wavelength division demultiplexing unit 704 and the third wavelength division demultiplexing unit 711 demultiplex the wavelength division multiplexed signals in the first optical fiber 703 respectively, to obtain the two downlink optical signals and downlink optical signals received from other access unit, a total of 2n downlink optical signals.

The first remote unit 705-1 includes two optical reception ports OPR. The first remote unit 705-1 can respectively receive the corresponding two downlink optical signals from the first wavelength division demultiplexing unit 704 through the two optical reception ports OPR, and the first remote unit 705-1 can convert the two downlink optical signals into two channels of downlink radio frequency signals via two optical modules (not shown). The other first remote units (for example, 705-n) are also similar and will not be described again.

The first antenna set 706-1 may include two antennas for transmitting two channels of downlink radio frequency signals from the first remote unit 705-1, for example, to a corresponding sector. The rest of the first antenna set (for example, 706-n) are also similar and will not be described again.

The second remote unit 712-1 includes two optical reception ports OPR. The second remote unit 712-1 can respectively receive the corresponding two downlink optical signals from the third wavelength division demultiplexing unit 711 through the two optical reception ports OPR, and the second remote unit 712-1 can convert the two downlink optical signals into two channels of downlink radio frequency signals via two optical modules (not shown). The other second remote units (for example, 712-n) are also similar and will not be described again.

The second antenna set 713-1 may include two antennas for transmitting two channels of downlink radio frequency signals from the second remote unit 712-1, for example, to a corresponding sector. The rest of the first antenna set (for example, 713-n) are also similar and will not be described again.

In addition, as also shown in FIG. 7, the first remote unit 705-1 includes two optical transmission ports OPT. The first remote unit 705-1 can receive a first uplink radio frequency signal set via the first antenna set 706-1, and the first uplink radio frequency signal set includes two channels of first uplink radio frequency signals. The first remote unit 705-1 can convert the two first uplink radio frequency signals into two first uplink optical signals via two optical modules (not shown), and the first remote unit 705-1 can transmit the two first uplink optical signals via two optical transmission ports OPT to the second wavelength division multiplexing unit 707. The other first remote units (for example, 705-n) are also similar and will not be described again.

The second remote unit 712-1 includes two optical transmission ports OPT. The second remote unit 712-1 may receive a second uplink radio frequency signal set via the second antenna set 713-1, and the second uplink radio frequency signal set includes two channels of second uplink radio frequency signals. The second remote unit 712-1 can convert the two channels of second uplink radio frequency signals into two second uplink optical signals via two optical modules (not shown), and the second remote unit 712-1 can transmit the two second uplink optical signals to the third wavelength division multiplexing unit 714 via two optical transmission ports OPT. The other second remote units (for example, 712-n) are also similar and will not be described again.

The second wavelength division multiplexing unit 707 multiplexes the two first uplink optical signals and the first uplink optical signals received from other first remote units (a total of 2n first uplink optical signals), to obtain wavelength division multiplexed signals. The third wavelength division multiplexing unit 714 multiplexes the two second uplink optical signals together with the second uplink optical signals received from other second remote units ((a total of 2n second optical signals) to obtain wavelength division multiplexing signals. The two wavelength division multiplexing signals are coupled by the optical coupling unit 715 and then are input to the second optical fiber 708, and then transmitted to the second wavelength division demultiplexing signals unit 709 via the second optical fiber 708.

The second wavelength division demultiplexing unit 709 demultiplexes the two wavelength division multiplexed signals in the second optical fiber 708 to obtain two first uplink optical signals and first uplink optical signals received from other first remote units, a total of 2n first uplink optical signals, and to obtain two second uplink optical signals and second uplink optical signals received from other second remote units, a total of 2n second uplink optical signals.

The access unit 701-1 includes four optical reception ports OPR. The access unit 701-1 receives corresponding two first uplink optical signals and two second uplink optical signals from the second wavelength division demultiplexing unit 709 via the four optical reception ports OPR, respectively. The access unit 701-1 converts the two first uplink optical signals into two first uplink radio frequency signals via a first optical module (not shown, coupled with two optical reception ports), and the access unit 701-1 converts the two second uplink optical signals into two second uplink radio frequency signals via a second optical module (not shown, coupled with two optical reception ports) for transmission to at least one base station. The rest of the access units (for example, 701-n) are also similar and will not be described again.

It should be understood that although FIG. 7 shows a situation of 2*2 MIMO, this is only an example, and other situations of MIMO, such as 4*4 MIMO, may also be used. For different MIMO scenarios, the access unit and the first remote unit may have a corresponding number of optical modules, optical transmission ports and optical reception ports, and the first antenna set may have a corresponding number of antennas, and the scope of the present disclosure is not limited herein.

As a result, through uplink/downlink fiber division transmission and external wavelength division multiplexers and demultiplexers, the chain-shaped cascade of the distributed antenna system is realized, which greatly reduces the impact of the uplink ground noise on the base station. For the case of multiple input, multiple output and multi-stage chain type, the multi-channel uplink optical signals for MIMO after electro-optical conversion are transmitted around the access unit through a single optical fiber for demultiplexing, and the number of fibers is greatly reduced compared to the conventional solution that requires multiple fibers for MIMO.

Figure 8:
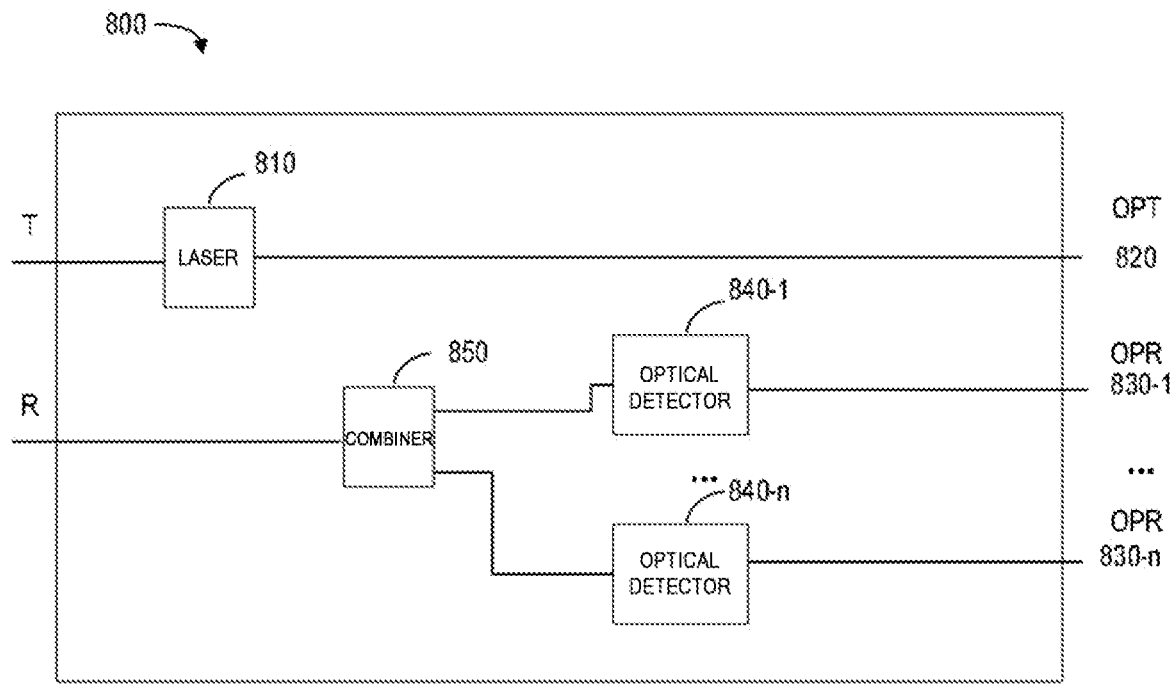
FIG. 8 illustrates a schematic diagram of a first optical module 800 in an access unit according to an embodiment of the present disclosure.

FIG. 8 illustrates a schematic diagram of a first optical module 800 in an access unit according to an embodiment of the present disclosure. As shown in FIG. 8, the first optical module 800 may include at least a first laser 810, a first optical transmission port (OPT) 820, first optical reception ports (OPR) 830-1 to 830-n, and first optical detectors 840-1 to 840-n and a combiner 850. The first laser 810 is used to convert the received downlink radio frequency signals into downlink optical signals, and sends them through the first optical transmission port 820. The first optical reception ports 830-1 to 830-n are used for receiving n uplink optical signals and outputting them to the first optical detectors 840-1 to 840-n. The first photodetectors 840-1 to 840-n are used to realize photoelectric conversion, and output n uplink radio frequency signals to the combiner 850 for combining and outputting.

Figure 9:
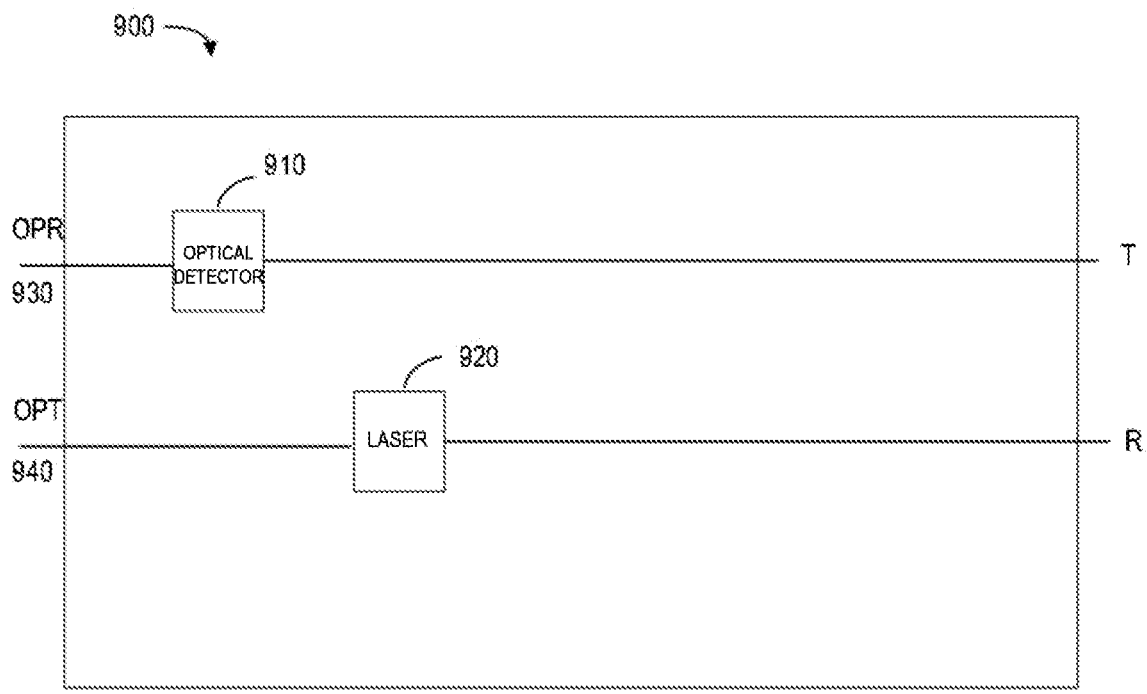
FIG. 9 illustrates a schematic diagram of a second optical module 900 in a remote unit according to an embodiment of the present disclosure.

FIG. 9 illustrates a schematic diagram of a second optical module 900 in a remote unit according to an embodiment of the present disclosure. As shown in FIG. 9, the second optical module 900 may include at least a second optical detector 910, a second laser 920, a second optical reception port 930 and a second optical transmission port 940. The second optical detector 910 receives the downlink optical signal from the second optical reception port 930, and converts the downlink optical signal into downlink radio frequency signals for output. The second laser 920 receives the uplink radio frequency signals and converts the uplink radio frequency signals into uplink optical signals, and sends them through the second optical transmission port 940.

The present disclosure also provides a communication system including one or more base stations and the above-mentioned distributed antenna system. The distributed antenna system is connected to one or more base stations in a coupling manner.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to explain the principles of the embodiments, the practical application or technical improvement over the technology in the marketplace, or to enable others of ordinary skill in the art to understand the embodiments disclosed herein.

I claim:

1. A distributed antenna system, comprising:
   one or more access units configured to receive multiple downlink radio frequency signal sets from at least one base station, and the one or more access units further configured to convert the multiple downlink radio frequency signal sets into multiple downlink optical signal sets;
   a first wavelength division multiplexing unit, coupled to the one or more access units, and configured to multiplex the multiple downlink optical signal sets to generate first wavelength division multiplexing optical signals, wherein the first wavelength division multiplexing unit is external to the one or more access units to receive the multiple downlink optical signal sets from multiple of the one or more access units;
   a first wavelength division demultiplexing unit configured to demultiplex the first wavelength division multiplexing optical signals to obtain the multiple downlink optical signal sets;
   a first optical fiber, coupled between the first wavelength division multiplexing unit and the first wavelength division demultiplexing unit, and configured to transmit the first wavelength division multiplexing optical signals; and
   one or more first remote units, coupled to the first wavelength division demultiplexing unit, and configured to convert the multiple downlink optical signal sets into the multiple downlink radio frequency signal sets for transmission, wherein the first wavelength division demultiplexing unit is external to the one or more first remote units to transmit the multiple downlink optical signal sets to multiple of the one or more first remote units.

2. The distributed antenna system of claim 1, wherein the one or more multiple first remote units are further configured to receive multiple first uplink radio frequency signal sets via one or more first antenna sets, and to convert the multiple first uplink radio frequency signal sets into multiple first uplink optical signal sets, and the distributed antenna system further comprising:
   a second wavelength division multiplexing unit, coupled to the one or more first remote units, and configured to multiplex the multiple first uplink optical signal sets to generate second wavelength division multiplexing optical signals;
   a second wavelength division demultiplexing unit configured to demultiplex the second wavelength division multiplexing optical signals to obtain the multiple first uplink optical signal sets;
   a second optical fiber, coupled between the second wavelength division multiplexing unit and the second wavelength division demultiplexing unit, and configured to transmit the second wavelength division multiplexing optical signals; and
   the one or more access units, coupled to the second wavelength division demultiplexing unit, and further configured to convert the multiple first uplink optical signal sets into the multiple first uplink radio frequency signal sets for transmission to the at least one base station.

3. The distributed antenna system of claim 1, further comprising:
an optical division unit, coupled between the first wavelength division multiplexing unit and the first wavelength division demultiplexing unit, and configured to divide the first wavelength division multiplexing optical signals to obtain third wavelength division multiplexing optical signals, wherein the optical division unit is external to the one or more access units;
a third wavelength division demultiplexing unit, coupled to the optical division unit, and configured to demultiplex the third wavelength division multiplexing optical signals to obtain the multiple downlink optical signal sets; and
one or more second remote units, coupled to the third wavelength division demultiplexing unit, and configured to convert the multiple downlink optical signal sets into the multiple downlink radio frequency signal sets for transmission.

4. The distributed antenna system of claim 3, wherein the one or more second remote units are further configured to receive multiple second uplink radio frequency signal sets via one or more second antenna sets, and to convert the multiple second uplink radio frequency signal sets into multiple second uplink optical signal sets, and the distributed antenna system further comprising:
a third wavelength division multiplexing unit, coupled to the one or more second remote units, and configured to multiplex the multiple second uplink optical signal sets to generate fourth wavelength division multiplexing optical signals; and
an optical coupling unit, coupled between the second wavelength division multiplexing unit and the second wavelength division demultiplexing unit, and coupled with the third wavelength division multiplexing unit, and configured to couple the fourth wavelength division multiplexing optical signals with the second wavelength division multiplexing optical signals for transmission through the second optical fiber;
the second wavelength division demultiplexing unit further configured to demultiplex the fourth wavelength division multiplexing optical signals to obtain the multiple second uplink optical signal sets; and
the one or more access units further configured to convert the multiple second uplink optical signal sets into the multiple second uplink radio frequency signal sets for transmission to the at least one base station.

5. The distributed antenna system of claim 3, further comprising:
a first optical amplifying unit, coupled between the first wavelength division multiplexing unit and the optical division unit, and configured to perform optical signal amplification on the first wavelength division multiplexing optical signals.

6. The distributed antenna system of claim 4, further comprising:
a second optical amplifying unit, coupled between the optical coupling unit and the second wavelength division demultiplexing unit, and configured to perform optical signal amplification on the second wavelength division multiplexing optical signals;
a third optical amplifying unit, coupled between the optical division unit and the third wavelength division demultiplexing unit, and configured to perform optical signal amplification on the third wavelength division multiplexing optical signals; and
a fourth optical amplifying unit, coupled between the third wavelength division multiplexing unit and the optical coupling unit, and configured to perform optical signal amplification on the fourth wavelength division multiplexing optical signals.

7. The distributed antenna system of claim 1, wherein each of the multiple access units configured to receive a corresponding downlink radio frequency signal set from the at least one base station, and the corresponding downlink radio frequency signal set including a multi-channel downlink radio frequency signals for MIMO, and each access unit further configured to convert the multi-channel downlink radio frequency signals into a downlink optical signal set, and the downlink optical signal set including multiple downlink optical signals, and the number of multiple downlink optical signals is the same as the number of channel of the multi-channel downlink radio frequency signals; and
each of the one or more first remote units configured to convert multiple downlink optical signals in a corresponding downlink optical signal set into the downlink radio frequency signal set for transmission.

8. The distributed antenna system of claim 1, wherein each of the multiple downlink radio frequency signal sets includes one channel of downlink radio frequency signal for SISO.

9. The distributed antenna system of claim 2, wherein each of the multiple first remote units is configured to receive a corresponding first uplink radio frequency signal set via a first antenna set coupled to the first remote unit, and the corresponding first uplink radio frequency signal set including multi-channel uplink radio frequency signals for MIMO, and the each first remote unit further configured to convert the multi-channel uplink radio frequency signals into a first uplink optical signal set, and the first uplink optical signal set including multiple uplink optical signals, and the number of the multiple uplink optical signals is the same as the number of channel of the multi-channel uplink radio frequency signals; and
each of the one or more access units configured to convert corresponding first uplink optical signal set into the first uplink radio frequency signal set for transmission to the at least one base station.

10. The distributed antenna system according to claim 2, wherein each of the multiple first uplink radio frequency signal sets comprises one channel of uplink radio frequency signals for SISO.

11. The distributed antenna system of claim 1, further comprising one or more first antenna sets, coupled to the multiple first remote units, and configured to transmit the multiple downlink radio frequency signal sets.

12. The distributed antenna system of claim 1, wherein the multiple downlink radio frequency signal sets are associated with one or more sectors.

13. A communication system comprising:
one or more base stations; and
a distributed antenna system comprising: one or more access units configured to receive multiple downlink radio frequency signal sets from at least one base station, and the one or more access units further configured to convert the multiple downlink radio frequency signal sets into multiple downlink optical signal sets;
a first wavelength division multiplexing unit, coupled to the one or more access units, and configured to multiplex the multiple downlink optical signal sets to generate first wavelength division multiplexing optical signals, wherein the first wavelength division multiplexing unit is external to the one or more access units to receive the multiple downlink optical signal sets from multiple of the one or more access units;

a first wavelength division demultiplexing unit configured to demultiplex the first wavelength division multiplexing optical signals to obtain the multiple downlink optical signal sets;

a first optical fiber, coupled between the first wavelength division multiplexing unit and the first wavelength division demultiplexing unit, and configured to transmit the first wavelength division multiplexing optical signals; and one or more first remote units, coupled to the first wavelength division demultiplexing unit, and configured to convert the multiple downlink optical signal sets into the multiple downlink radio frequency signal sets for transmission, the distributed antenna system coupled to the one or more base stations, wherein the first wavelength division demultiplexing unit is external to the one or more first remote units to transmit the multiple downlink optical signal sets to multiple of the one or more first remote units.

14. The communication system of claim 13, wherein the one or more multiple first remote units are further configured to receive multiple first uplink radio frequency signal sets via one or more first antenna sets, and to convert the multiple first uplink radio frequency signal sets into multiple first uplink optical signal sets, and the distributed antenna system further comprising:

a second wavelength division multiplexing unit, coupled to the one or more first remote units, and configured to multiplex the multiple first uplink optical signal sets to generate second wavelength division multiplexing optical signals;

a second wavelength division demultiplexing unit configured to demultiplex the second wavelength division multiplexing optical signals to obtain the multiple first uplink optical signal sets;

a second optical fiber, coupled between the second wavelength division multiplexing unit and the second wavelength division demultiplexing unit, and configured to transmit the second wavelength division multiplexing optical signals; and the one or more access units, coupled to the second wavelength division demultiplexing unit, and further configured to convert the multiple first uplink optical signal sets into the multiple first uplink radio frequency signal sets for transmission to the at least one base station.

15. The communication system of claim 13, wherein each of the multiple access units configured to receive a corresponding downlink radio frequency signal set from the at least one base station, and the corresponding downlink radio frequency signal set including a multi-channel downlink radio frequency signals for MIMO, and each access unit further configured to convert the multi-channel downlink radio frequency signals into a downlink optical signal set, and the downlink optical signal set including multiple downlink optical signals, and the number of multiple downlink optical signals is the same as the number of channel of the multi-channel downlink radio frequency signals; and each of the one or more first remote units configured to convert multiple downlink optical signals in a corresponding downlink optical signal set into the downlink radio frequency signal set for transmission.

16. The communication system of claim 13, wherein each of the multiple downlink radio frequency signal sets includes one channel of downlink radio frequency signal for SISO.

17. The communication system of claim 14, wherein each of the multiple first remote units is configured to receive a corresponding first uplink radio frequency signal set via a first antenna set coupled to the first remote unit, and the corresponding first uplink radio frequency signal set including multi-channel uplink radio frequency signals for MIMO, and the each first remote unit further configured to convert the multi-channel uplink radio frequency signals into a first uplink optical signal set, and the first uplink optical signal set including multiple uplink optical signals, and the number of the multiple uplink optical signals is the same as the number of channel of the multi-channel uplink radio frequency signals; and each of the one or more access units configured to convert corresponding first uplink optical signal set into the first uplink radio frequency signal set for transmission to the at least one base station.

18. The communication system of claim 14, wherein each of the multiple first uplink radio frequency signal sets comprises one channel of uplink radio frequency signals for SISO.

19. The communication system of claim 13, further comprising one or more first antenna sets, coupled to the multiple first remote units, and configured to transmit the multiple downlink radio frequency signal sets.

20. The communication system of claim 13, wherein the multiple downlink radio frequency signal sets are associated with one or more sectors.

* * * * *